US007318034B2

(12) United States Patent
Sato

(10) Patent No.: US 7,318,034 B2
(45) Date of Patent: Jan. 8, 2008

(54) SPEECH SIGNAL INTERPOLATION DEVICE, SPEECH SIGNAL INTERPOLATION METHOD, AND PROGRAM

(75) Inventor: Yasushi Sato, Nagareyama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 739 days.

(21) Appl. No.: 10/477,320

(22) PCT Filed: May 28, 2003

(86) PCT No.: PCT/JP03/06691

§ 371 (c)(1),
(2), (4) Date: Nov. 10, 2003

(87) PCT Pub. No.: WO03/104760

PCT Pub. Date: Dec. 18, 2003

(65) Prior Publication Data

US 2004/0153314 A1 Aug. 5, 2004

(30) Foreign Application Priority Data

Jun. 7, 2002 (JP) ............................ 2002-167453

(51) Int. Cl.
*G10L 13/00* (2006.01)
*G10L 11/04* (2006.01)
*G06F 17/17* (2006.01)

(52) U.S. Cl. ....................... 704/265; 704/207; 708/290

(58) Field of Classification Search ................ 704/207, 704/265; 708/290, 313
See application file for complete search history.

(56) References Cited

U.S. PATENT DOCUMENTS 4,783,805 A * 11/1988 Nishio et al. ............... 704/207

(Continued)

FOREIGN PATENT DOCUMENTS

EP 1 422 690 5/2004

(Continued)

OTHER PUBLICATIONS

Supplementary International Search Report dated Jan. 5, 2006 for Application No. 03730668.5.

(Continued)

*Primary Examiner*—Patrick N. Edouard
*Assistant Examiner*—Joel Stoffregen
(74) *Attorney, Agent, or Firm*—Eric J. Robinson; Robinson Intellecutal Property Law Office, P.C.

(57) ABSTRACT

A voice signal interpolation apparatus is provided which can restore original human voices from human voices in a compressed state while maintaining a high sound quality. When a voice signal representative of a voice to be interpolated is acquired by a voice data input unit 1, a pitch deriving unit 2 filters this voice signal to identify a pitch length from the filtering result. A pitch length fixing unit 3 makes the voice signal have a constant time length of a section corresponding to a unit pitch, and generates pitch waveform data. A sub-band dividing unit 4 converts the pitch waveform data into sub-band data representative of a spectrum. A plurality of sub-band data pieces are averaged by an averaging unit 5 and thereafter a sub-band synthesizing unit 6 converts the sub-band data pieces into a signal representative of a waveform of the voice by a sub-band synthesizing unit 6. The time length of this signal in each section is restored by a pitch restoring unit 7 and a sound output unit 8 reproduces the sound represented by the signal.

4 Claims, 7 Drawing Sheets

U.S. PATENT DOCUMENTS

| | | | | | |
|---|---|---|---|---|---|
| 4,791,671 | A | * | 12/1988 | Willems | 704/217 |
| 5,003,604 | A | * | 3/1991 | Okazaki et al. | 704/207 |
| 5,577,159 | A | * | 11/1996 | Shoham | 704/206 |
| 5,903,866 | A | * | 5/1999 | Shoham | 704/265 |
| 7,043,424 | B2 | * | 5/2006 | Chen et al. | 704/207 |

FOREIGN PATENT DOCUMENTS

| | | |
|---|---|---|
| JP | 09-006398 | 1/1997 |
| JP | 2001-356788 | 12/2001 |
| JP | 2002-015522 | 1/2002 |
| JP | 2002-073096 | 3/2002 |
| JP | 2002-132298 | 5/2002 |
| WO | WO 01/97212 | 12/2001 |
| WO | WO 02/35517 | 5/2002 |

OTHER PUBLICATIONS

International Search Report, Jul. 8, 2003.

* cited by examiner

PRIOR ART (a)

SPEECH SIGNAL INTERPOLATION DEVICE, SPEECH SIGNAL INTERPOLATION METHOD, AND PROGRAM

TECHNICAL FIELD

The present invention relates to an apparatus, method and program for voice signal interpolation.

RELATED BACKGROUND ART

Music programs and the like are distributed remarkably nowadays by means of wired or radio broadcast or communication. For the distribution of music programs and the like, it is important to prevent a music data amount from becoming large and an occupied band width from broadening, if the band width is made too broad. To avoid this, music data is distributed after it is compressed by a voice compression format incorporating a frequency masking method, such as an MP3 (MPEG1 audio layer 3) format and an AAC (Advanced Audio Coding) format.

The frequency masking method is a method of compressing voices by utilizing the phenomenon that a human being is hard to hear the spectrum components of a low level sound signal whose frequency is near the spectrum components of a high level sound signal.

FIG. 4(*b*) is a graph showing the results of compressing an original sound spectrum shown in FIG. 4(*a*) by using the frequency masking method (FIG. 4(*a*) shows an example of the spectrum obtained by compressing voices produced by a human being by the MP3 format).

As shown, as the voices are compressed by the frequency masking method, generally the components having a frequency of 2 kHz or higher are lost considerably, and the components even lower than 2 kHz near the components providing a spectrum peak (spectrum of a fundamental frequency components and harmonic components of voices) are also lost considerably.

A method disclosed in Japanese Patent Laid-open Publication No. 2001-356788 interpolates a compressed voice spectrum to obtain an original voice spectrum. According to this method, an interpolation band is derived from the spectrum left after the compression and the spectrum components indicating the same distribution as that in the interpolation band are inserted into the band whose spectrum components were lost by the compression, so as to match the envelope line of the whole spectrum.

If the spectrum shown in FIG. 4(*b*) is interpolated by the method disclosed in the Japanese Patent Laid-open Publication No. 2001-356788, the spectrum shown in FIG. 4(*c*) is obtained which is quite different from the spectrum of the original voices. Even if the voices having this spectrum are reproduced, only very unnatural voices are obtained. This problem is generally associated with voices produced by a human being and compressed by this method.

The present invention has been made under the above-described circumstances and it is an object of the invention to provide a frequency interpolation apparatus and method for recovering voices of a human being from the compressed voices while maintaining a high sound quality.

DISCLOSURE OF THE INVENTION

In order to achieve the above object, a voice signal interpolation apparatus according to a first aspect of the invention, comprises:

pitch waveform signal generating means for acquiring an input voice signal representative of a waveform of voice and making a time length of a section corresponding to a unit pitch of the input voice signal be substantially the same to transform the input voice signal into a pitch waveform signal;

spectrum deriving means for generating data representative of a spectrum of the input voice signal in accordance with the pitch waveform signal;

averaging means for generating averaged data representative of a spectrum of a distribution of average values of respective spectrum components of the input voice signal, in accordance with a plurality of data pieces generated by the spectrum deriving means; and voice signal restoring means for generating an output voice signal representative of voice having a spectrum represented by the averaged data generated by the averaging means.

The pitch waveform signal generating means may comprise:

a variable filter whose frequency characteristics can be controlled to be variable, the variable filter filtering the input voice signal to derive a fundamental frequency component of the input voice;

filter characteristic determining means for identifying a fundamental frequency of the input voice in accordance with the fundamental frequency component derived by the variable filter and controlling the variable filter so as to have the frequency characteristics cutting off frequency components other than frequency components near the identified fundamental frequency;

pitch deriving means for dividing the input voice signal into a voice signal in the section corresponding to the unit pitch, in accordance with a value of the fundamental frequency component derived by the variable filter; and pitch length fixing means for generating the pitch waveform signal having substantially the same time length in each section by sampling each section of the input voice signal at substantially the same number of samples.

The filter characteristic determining means may include cross detecting means for identifying a period of timings at which the fundamental frequency components derived by the variable filter reach a predetermined value and identifying the fundamental frequency in accordance with the identified period.

The filter characteristic determining means may comprise:

average pitch detecting means for detecting a time length of a pitch of voice represented by the input voice signal in accordance with the input voice signal before being filtered; and judging means for judging whether the period identified by the cross detecting means and the time length of the pitch identified by the average pitch detecting means are different each other by a predetermined amount or more, if it is judged that the period and the time length are not different, controlling the variable filter so as to have the frequency characteristics cutting off frequency components other than frequency components near the fundamental frequency identified by the cross detecting means, and if it is judged that the period and the time length are different, controlling the variable filter so as to have the frequency characteristics cutting off frequency components other than frequency components near a fundamental frequency identified from the time length of the pitch identified by the average pitch detecting means.

The average pitch detecting means may comprise:

cepstrum analyzing means for calculating a frequency at which a cepstrum of the input voice signal before filtered by the variable filter takes a maximal value;

self-correlation analyzing means for calculating a frequency at which a periodgram of the input voice signal before filtered by the variable filter takes a maximal value; and average calculating means for calculating an average value of pitches of voice represented by the input voice signal in accordance with the frequencies calculated by the cepstrum analyzing means and the self-correlation analyzing means and identifying the calculated average value as the time length of the pitch of the voice.

A voice signal interpolation method according to a second aspect of the invention, comprises steps of:

acquiring an input voice signal representative of a waveform of voice and making a time length of a section corresponding to a unit pitch of the input voice signal be substantially the same to transform the input voice signal into a pitch waveform signal;

generating data representative of a spectrum of the input voice signal in accordance with the pitch waveform signal;

generating averaged data representative of a spectrum of a distribution of average values of respective spectrum components of the input voice signal, in accordance with a plurality of data pieces; and generating an output voice signal representative of voice having a spectrum represented by the averaged data.

According to a third aspect of the invention, a program is provided which makes a computer operate as:

pitch waveform signal generating means for acquiring an input voice signal representative of a waveform of voice and making a time length of a section corresponding to a unit pitch of the input voice signal be substantially the same to transform the input voice signal into a pitch waveform signal;

spectrum deriving meas for generating data representative of a spectrum of the input voice signal in accordance with the pitch waveform signal;

averaging means for generating averaged data representative of a spectrum of a distribution of average values of respective spectrum components of the input voice signal, in accordance with a plurality of data pieces generated by the spectrum deriving means; and voice signal restoring means for generating an output voice signal representative of voice having a spectrum represented by the averaged data generated by the averaging means.

DESCRIPTION OF THE PREFERRED EMBODIMENT

With reference to the accompanying drawings, an embodiment of the invention will be described.

Figure 1:
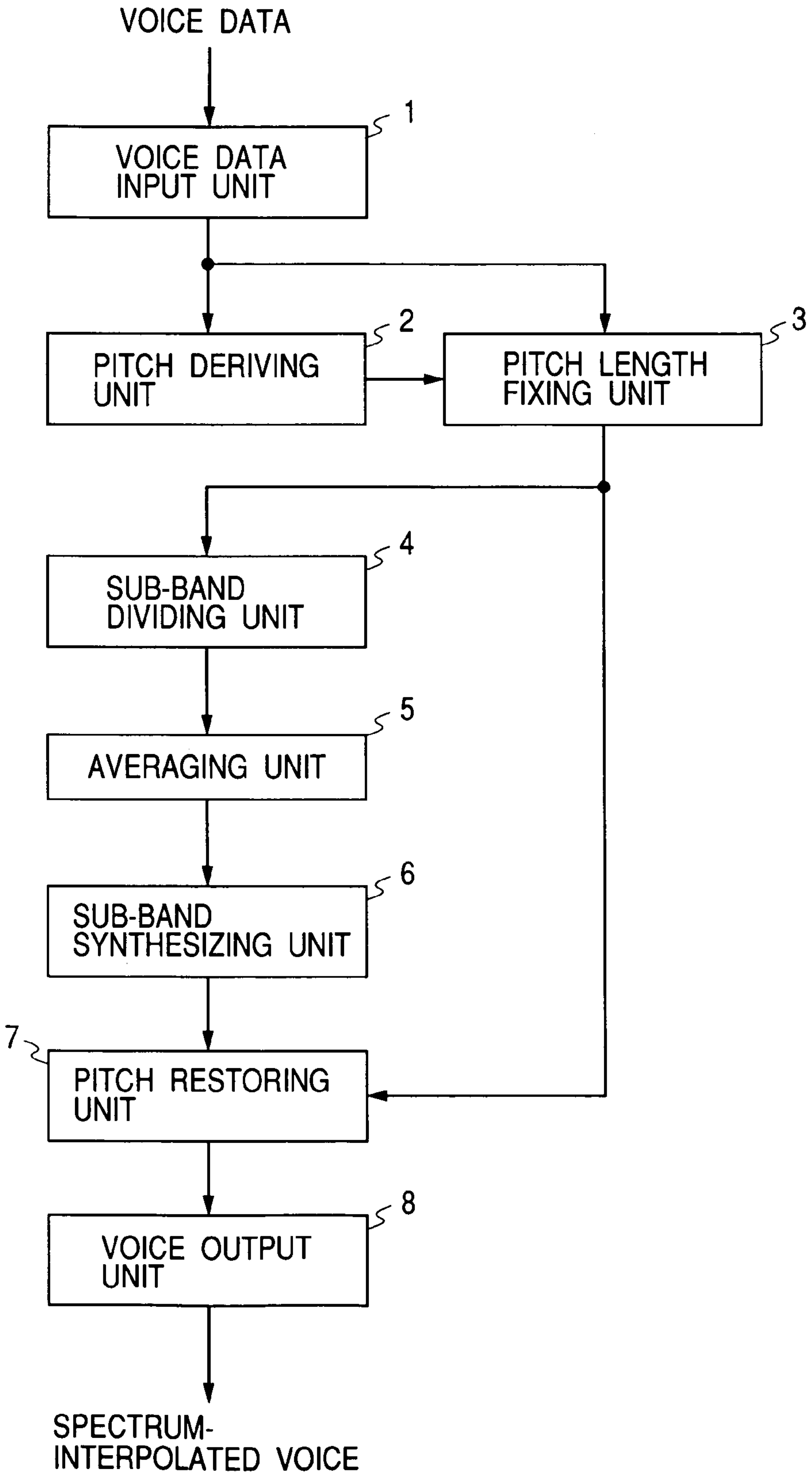
FIG. 1 is a diagram showing the structure of a voice signal interpolation apparatus according to an embodiment of the invention.

FIG. 1 is a diagram showing the structure of a voice signal interpolation apparatus according to an embodiment of the invention. As shown, this voice signal interpolation apparatus is constituted of a voice data input unit 1, a pitch deriving unit 2, a pitch length fixing unit 3, a sub-band dividing unit 4, an averaging unit 5, a sub-band synthesizing unit 6, a pitch restoring unit 7 and a voice output unit 8.

The voice data input unit 1 is constituted of a recording medium drive such as a flexible disk drive, an MO (Magneto Optical disk) drive and a CD-R (Compact Disc-Recordable) drive for reading data recorded on a recording medium such as a flexible disk, an MO and a CD-R.

The voice data input unit 1 obtains voice data representative of a voice waveform and supplies it to the pitch fixing unit 3.

The voice data has the format of a digital signal modulated by PCM (Pulse Code Modulation), and it is assumed that the voice data is representative of a voice sampled at a constant period sufficiently shorter than a voice pitch.

The pitch deriving unit 2, pitch length fixing unit 3, sub-band dividing unit 4, sub-band synthesizing unit 6 and pitch restoring unit 7 are each constituted of a data processing device such as a DSP (Digital Signal Processor) and a CPU (Central Processing Unit).

Some or the whole of the functions of the pitch deriving unit 2, pitch length fixing unit 3, sub-band dividing unit 4, sub-band synthesizing unit 6 and pitch restoring unit 7 may be realized by a single data processing device.

Figure 2:
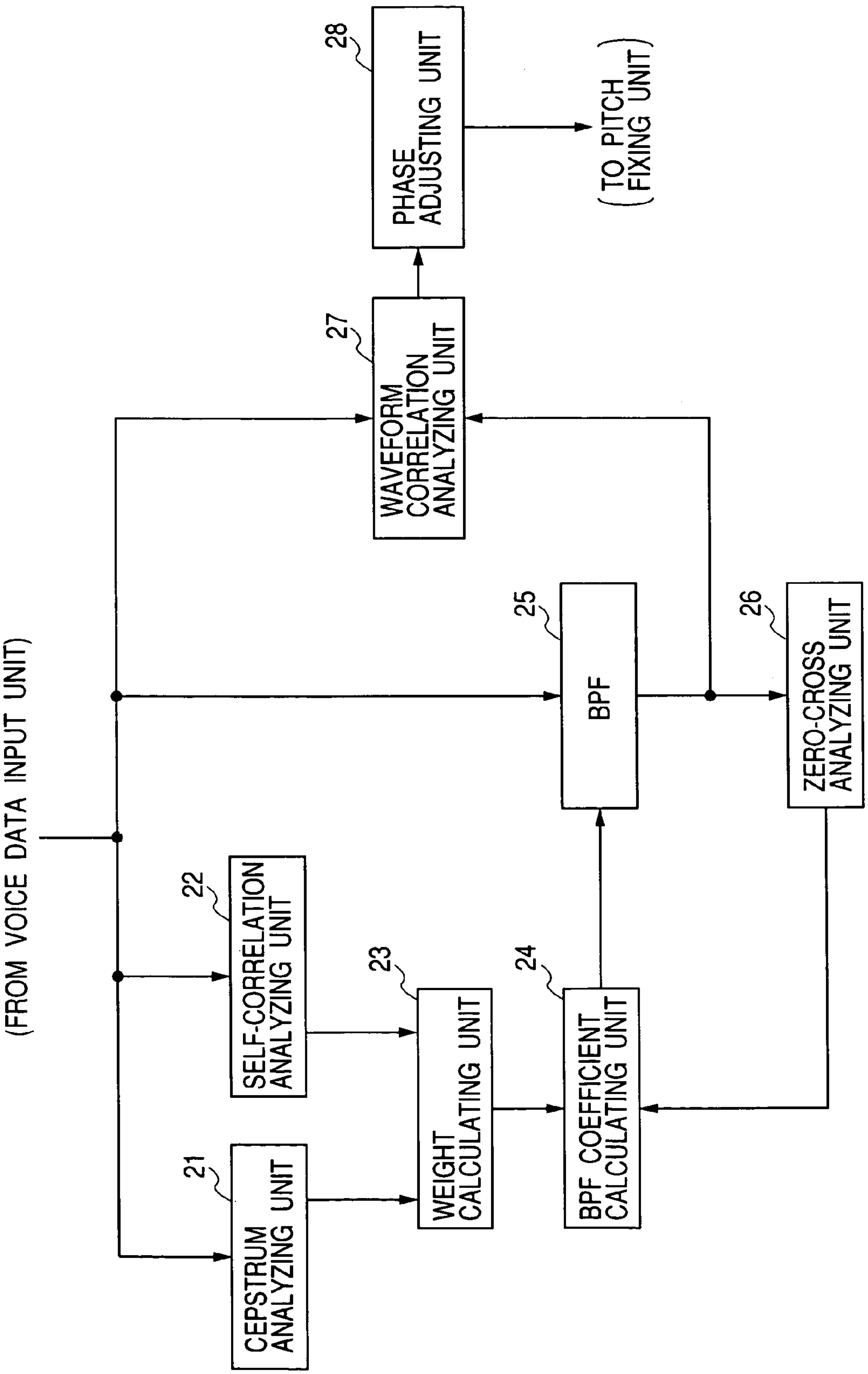
FIG. 2 is a block diagram showing the structure of a pitch deriving unit.

The pitch deriving unit 2 is functionally constituted of, for example as shown in FIG. 2, a cepstrum analyzing unit 21, a self-correlation analyzing unit 22, a weight calculating unit 23, a BPF (Band Pass Filter) coefficient calculating unit 24, a BPF 25, a zero-cross analyzing unit 26, a waveform correlation analyzing unit 27 and a phase adjusting unit 28.

Some or the whole of the cepstrum analyzing unit 21, self-correlation analyzing unit 22, weight calculating unit 23, BPF (Band Pass Filter) coefficient calculating unit 24, BPF 25, zero-cross analyzing unit 26, waveform correlation analyzing unit 27 and phase adjusting unit 28 may be realized by a single data processing device.

The cepstrum analyzing unit 21 cepstrum-analyzes the voice data supplied from the voice data input unit 1, identifies a fundamental frequency of the voice represented by the voice data, and generates data representative of the identified fundamental frequency to supply it to the weight calculating unit 23.

More specifically, when voice data is supplied from the voice data input unit 1, the cepstrum analyzing unit 21 first converts the intensity of this voice data into a value substantially equal to the logarithm of an original value (the base of the logarithm is arbitrary, for example, a common logarithm may be used).

Next, the cepstrum analyzing unit 21 calculates a spectrum of the value converted voice data (i.e., cepstrum) by fast Fourier transform (or other arbitrary method of generating data representative of a Fourier transformed discrete variable).

The lowest frequency among frequencies providing maximal values of the cepstrum is identified as the fundamental frequency, and data representative of the identified fundamental frequency is generated and supplied to the weight calculating unit 23.

When the voice data is supplied from the voice data input unit 1, the self-correlation analyzing unit 22 identifies the fundamental frequency of the voice representative of the voice data in accordance with the self-correlation function of the waveform of the voice data, generates data representative of the identified fundamental frequency to supply it to the weight calculating unit 23.

More specifically, when voice data is supplied from the voice data input unit 1, the self-correlation analyzing unit 22 first identifies a self-correlation function r indicated by the right term of the equation (1):

$$r(1)=1/N\{\hat{e}(t+1)\cdot\hat{e}(t)\}$$

where N is the total sum of samples of voice data and ê(á) is the value of the á-th sample as counted from the first sample of voice data.

Next, the self-correlation analyzing unit 22 identifies the fundamental frequency which is the lowest frequency lower than a predetermined lower limit frequency, among those frequencies providing maximal values of a function (periodgram) obtained through Fourier transform of the self-correlation function r(1), generates data representative of the identified fundamental frequency to supply it to the weight calculating unit 23.

When the two pieces of data representative of the fundamental frequencies are supplied from the cepstrum analyzing unit 21 and self-correlation analyzing unit 22, the weight calculating unit 23 calculates an average of absolute values of the inverse numbers of the fundamental frequencies represented by the two pieces of data. Data representative of the calculated value (i.e., average pitch length) is generated and supplied to the BPF coefficient calculating unit 24.

The BPF coefficient calculating unit 24 is supplied with the data representative of the average pitch length from the weight calculating unit 23 and a zero-cross signal from the zero cross analyzing unit 26 to be later described, and in accordance with the supplied data and zero-cross signal, judges whether the average pitch length, a pitch signal and the zero-cross period are different each other by a predetermined amount. If it is judged that they are not different, the frequency characteristics of BPF 25 are controlled so that the center frequency (center frequency of the pass band of BPF 25) becomes the inverse of the zero-cross period. If it is judged that they are different by the predetermined amount, the frequency characteristics of BPF 25 are controlled so that the center frequency becomes the inverse of the average pitch length.

BPF 25 has a FIR (Finite Impulse Response) type filter function capable of changing its center frequency.

More specifically, BPF 25 sets its own center frequency to the same value as that controlled by the BPF coefficient calculating unit 24. BPF 25 filters the voice data supplied from the voice data input unit 1 and supplies the filtered voice signal (pitch signal) to the zero-cross analyzing unit 26 and waveform correlation analyzing unit 27. The pitch signal is assumed to be digital data having a sampling period substantially same as that of voice data.

The band width of BPF 25 is preferably set so that the upper limit of the pass band of BPF 25 falls in a range of twice the fundamental frequency of a voice represented by voice data or lower.

The zero-cross analyzing unit 26 detects the timing (zero-cross timing) when the instantaneous value of the pitch signal supplied from BPF 25 becomes "0" and supplies the signal (zero-cross signal) representative of the detected timing to the BPF coefficient calculating unit 24.

The zero-cross analyzing unit 26 may detect the timing when the instantaneous value of the pitch signal takes a predetermined value, and supplies it to the BPF coefficient calculating unit 24 in place of the zero-cross signal.

The waveform correlation analyzing unit 27 is supplied with the voice data from the voice data input unit 1 and the pitch signal from the waveform correlation analyzing unit 27, and divides the voice data at the timing of a unit period (e.g., one period) of the pitch signal. The waveform correlation analyzing unit 27 calculates a correlation between voice data given various phases and pitch signals in each divided section, and determines the phase of voice data having a highest correlation as the phase of the voice data in that section.

More specifically, the waveform correlation analyzing unit 27 calculates, for example, the value cor represented by the right term of the equation (2) for each section and for each of various phases ö (ö is an integer of 0 or larger). The waveform correlation analyzing unit 27 identifies a value Ø of ö corresponding to the largest value cor, generates data representative of the value Ø and supplies it to the phase adjusting unit 28 as the phase data representative of the phase of the voice data in each section.

$$\mathrm{cor}=\{f(i-\ddot{o})\cdot g(i)\}$$

where n is the total sum of samples in a section, f(β) is the value of a β-th sample as counted from the first sample of voice data in the section, g(ã) is the value of a ã-th sample of a pitch signal in the section.

The time length of a section is preferably about one pitch. The longer the section, the number of samples in the section increases more so that the data amount of a pitch waveform signal increases or the sample period becomes long and the voice represented by the pitch waveform signal becomes incorrect.

The phase adjusting unit 28 is supplied with the voice data from the voice input unit 1 and the data representative of the phase Ø of the voice date in each section from the waveform correlation analyzing unit 27, and sets the phase of the voice data in the section equal to the phase Ø in this section representative of the phase data. The phase-shifted voice data is supplied to the pitch length fixing unit 3.

The pitch length fixing unit 3 supplied with the phase-shifted voice data from the phase adjusting unit 28 re-samples the voice data in the section, and supplies the re-sampled voice data to the sub-band dividing unit 4. The pitch length fixing unit 3 re-samples in such a manner that the number of samples of the voice data in each section becomes generally equal and the samples are arranged at an equal pitch in the section.

The pitch length fixing unit 3 generates sample number data representative of the number of original samples in each section, and supplies it to the voice output unit 8. If the sampling period of voice data acquired by the voice input unit 1 is already known, the sample number data is the information representative of the original time length of the voice data in the section corresponding to the unit pitch.

The sub-band dividing unit 4 performs orthogonal transform such as DCT (Discrete Cosine Transform) or discrete Fourier transform (e.g., fast Fourier transform) of the voice data supplied from the pitch length fixing unit 3 to thereby generate sub-band data at a constant period (e.g., a period corresponding to a unit pitch or a period corresponding to an integer multiple of a unit pitch). Each time the sub-band data is generated, this data is supplied to the averaging unit 5. The sub-band data 5 represents a spectrum distribution of a voice represented by the voice data supplied from the sub-band dividing unit 4.

In accordance with the sub-band data supplied from the sub-band dividing unit 4 a plurality of times, the averaging unit 5 generates sub-band data (hereinafter called averaged sub-band data) which is an average of the values of spectrum components, and supplies it to the sub-band synthesizing unit 6.

Figure 3:
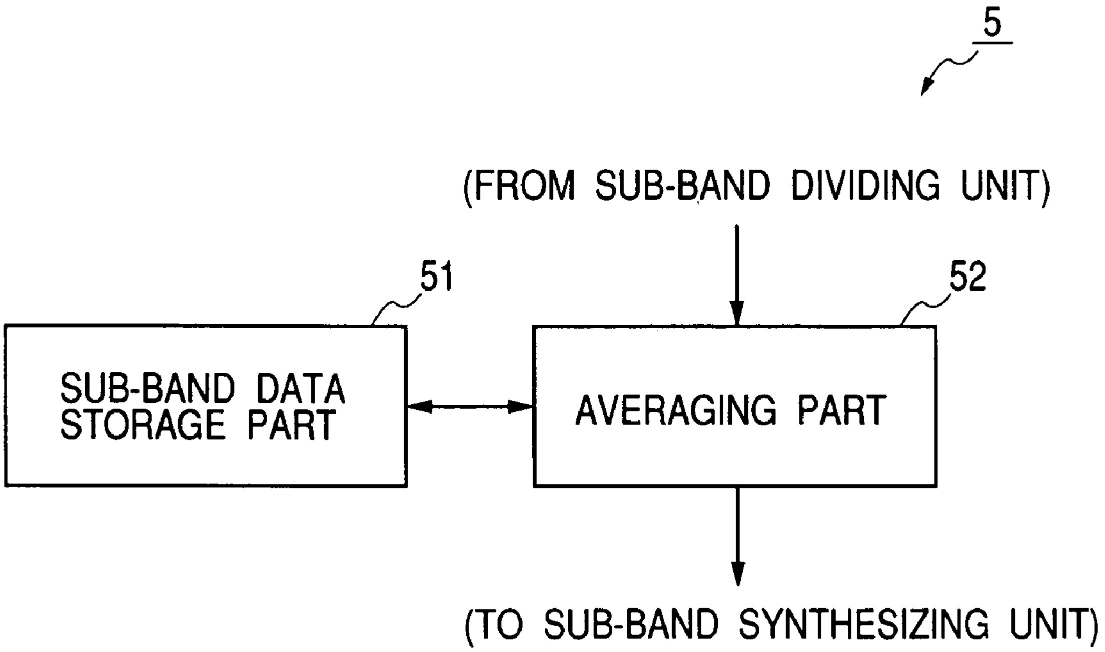
FIG. 3 is a block diagram showing the structure of an averaging unit.

The averaging unit 5 is functionally constituted of, as shown in FIG. 3, a sub-band data storage part 51 and an averaging part 52.

The sub-band data storage part 51 is a memory such as a RAM (Random Access Memory) and stores three pieces of sub-band data most recently supplied from the sub-band dividing unit 4 upon access by the averaging part 52. Upon access by the averaging part 52, the sub-band data storage part 51 supplies the oldest two pieces of the stored sub-band data (third and second oldest pieces) to the averaging part 52.

The averaging part 52 is made of a DSP, a CPU or the like. Some or the whole of the function of the pitch deriving unit 2, pitch length fixing unit 3, sub-band dividing unit 4, sub-band synthesizing unit 6 and pitch restoring unit 7 may be realized by a single data processing device in the averaging part 52.

Each time one piece of the sub-band data is supplied from the sub-band dividing unit 4, the averaging part 52 accesses the sub-band data storage part 51. The newest sub-band data supplied from the sub-band dividing unit 4 is stored in the sub-band data storage part 51. The averaging part 52 reads the oldest two pieces of the sub-band data from the sub-band data area 51.

The averaging part 52 calculates an average value (e.g., an arithmetical mean) of intensities of the spectrum components of three pieces of the sub-band data at the same frequency. These three pieces of the sub-band data include one piece of the sub-band data supplied from the sub-band dividing unit 4 and two pieces of the sub-band data read from the sub-band data storage area 51. The averaging part 52 generates the data (averaged sub-band data) representative of the frequency distribution of the calculated averages of intensities of the spectrum components and supplies it to the sub-band synthesizing unit 6.

Of the spectrum components representing the three pieces of the sub-band data used for generating the average sub-band data, the intensities at a frequency f ($f>0$) are represented by i1, i2 and i3 ($i1 \geqq 0$, $i2 \geqq 0$, $i3 \geqq 0$). The intensity of the averaged sub-band data at the frequency f of the spectrum component represented by the averaged sub-band data is equal to an average value of i1, i2 and i3 (e.g., an arithmetical mean of i1, i2 and i3).

The sub-band synthesizing unit 6 transforms the averaged sub-band data supplied from the averaging unit 5 into such voice data as the intensity of each frequency component is represented by the averaged sub-band data. The sub-band synthesizing unit 6 supplies the generated voice data to the pitch restoring unit 7. The voice data generated by the sub-band synthesizing unit 6 may be a PCM modulated digital signal.

The transform of the averaged sub-band data by the sub-band synthesizing unit 6 is substantially an inverse transform relative to the transform made by the sub-band dividing unit 4 to generate the sub-band data. More specifically, for example, if the sub-band data is generated through DCT of voice data, the sub-band synthesizing unit 6 generates voice data through IDCT (Inverse DCT) of the averaged sub-band data.

The pitch restoring unit 7 re-samples each section of voice data supplied from the sub-band synthesizing unit 6 at the sample number represented by the sample number data supplied from the pitch length fixing unit 3, to thereby restore the time length of each section before being changed by the pitch length fixing unit 3. The voice data with the restored time length in each section is supplied to the voice output unit 8.

The voice output unit 8 is made of a PCM decoder, a D/A (Digital-to-Analog) converter, an AF (Audio Frequency) amplifier, a speaker and the like.

The voice output unit 8 receives the voice data with the restored time length in each section from the pitch restoring unit 7, demodulates the voice data, D/A converts and amplifies it. The obtained analog signal drives a speaker to reproduce voices.

Voices obtained by the operation described above will be described with reference to FIG. 4 and FIGS. 5 to 7.

Figure 4:
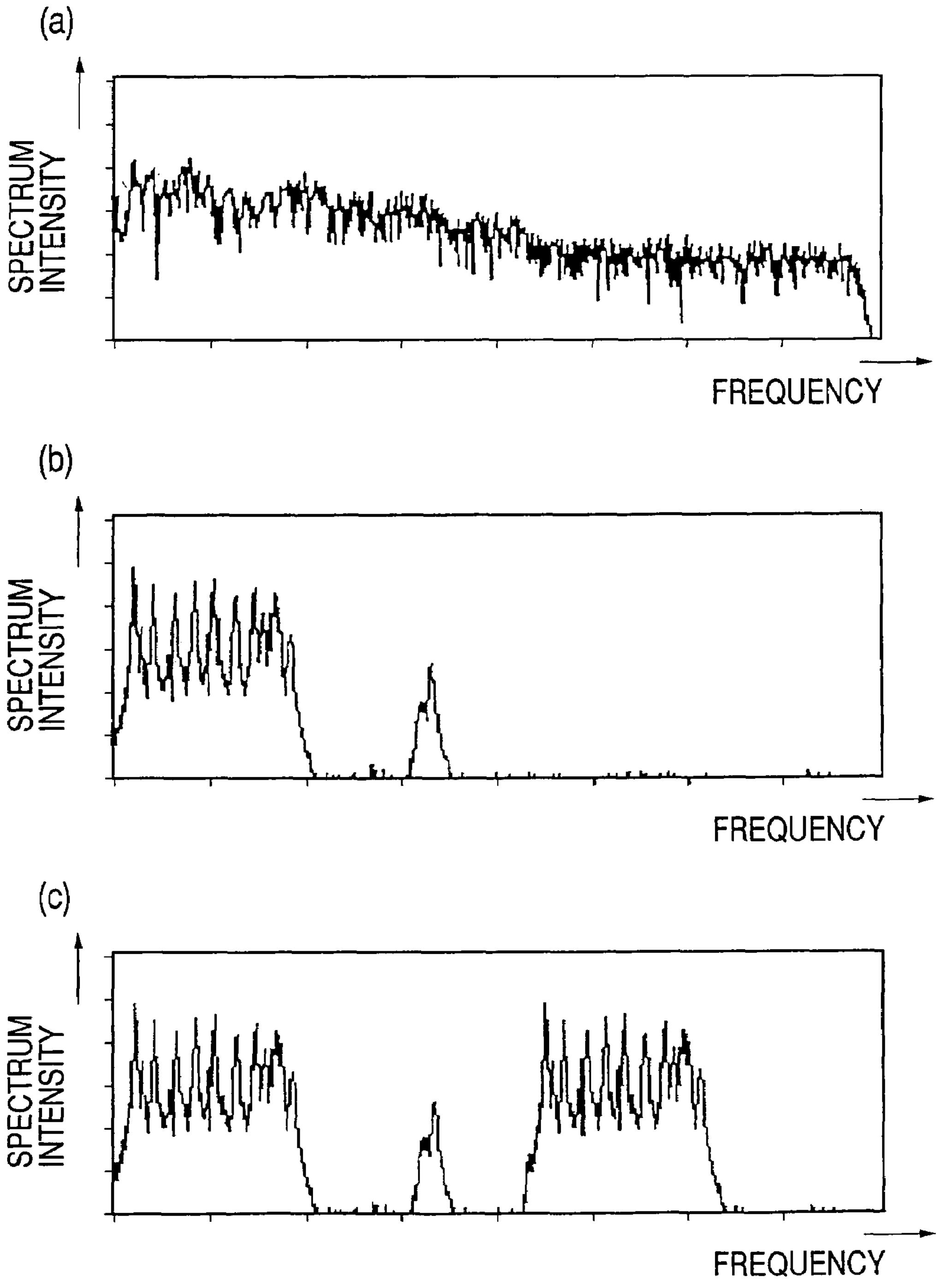
FIG. 4(*a*) is a graph showing an example of a spectrum of an original voice, FIG. 4(*b*) is a graph showing a spectrum obtained by compressing the spectrum shown in FIG. 4(*a*) by using the frequency masking method, and FIG. 4(*c*) is a graph showing a spectrum obtained by interpolating the signal having the spectrum shown in FIG. 4(*a*) by using a conventional method.
Figure 5:
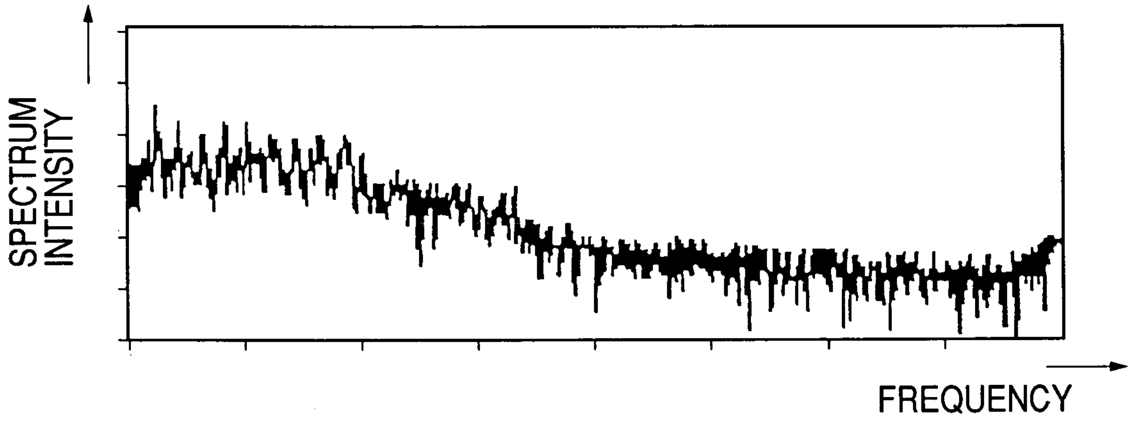
FIG. 5 is a graph showing a spectrum of a signal obtained by interpolating the signal having the spectrum shown in FIG. 4(*b*) with the voice interpolation apparatus shown in FIG. 1.

FIG. 5 is a graph showing a spectrum of a signal obtained by interpolating the signal having the spectrum shown in FIG. 4(*a*) with the voice interpolation apparatus shown in FIG. 1.

Figure 6:
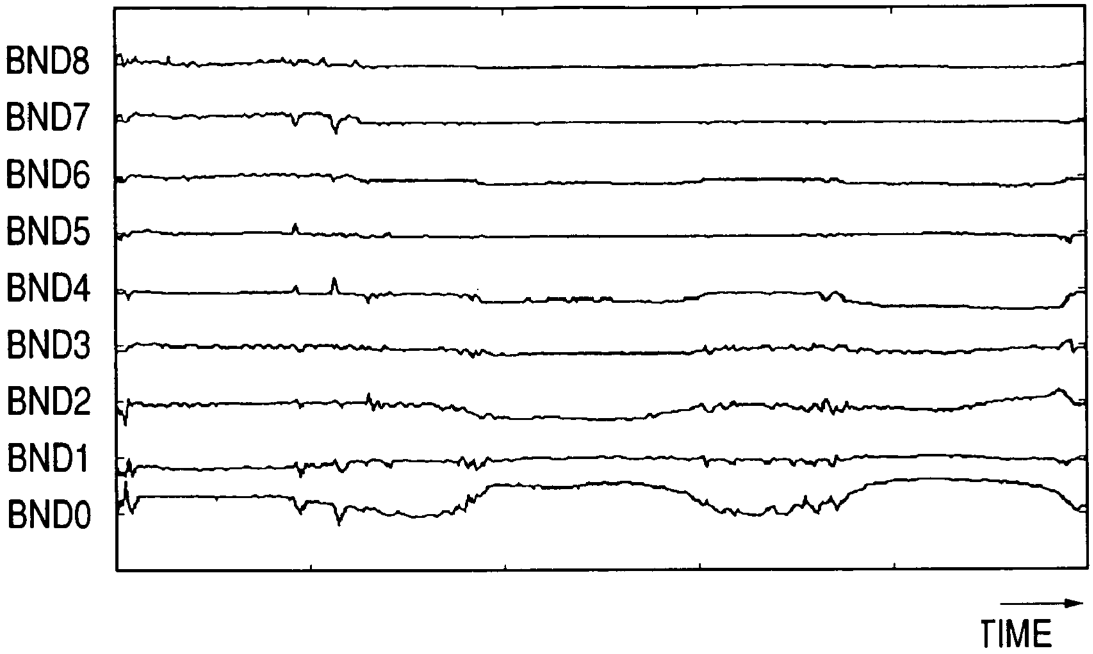
FIG. 6(*a*) is a graph showing a time change in the intensity of the fundamental frequency component and harmonic components of the voice having the spectrum shown in FIG. 4(*a*), and FIG. 6(*b*) is a graph showing a time change in the intensity of the fundamental frequency component and harmonic components of the voice having the spectrum shown in FIG. 4(*b*).
Figure 6:
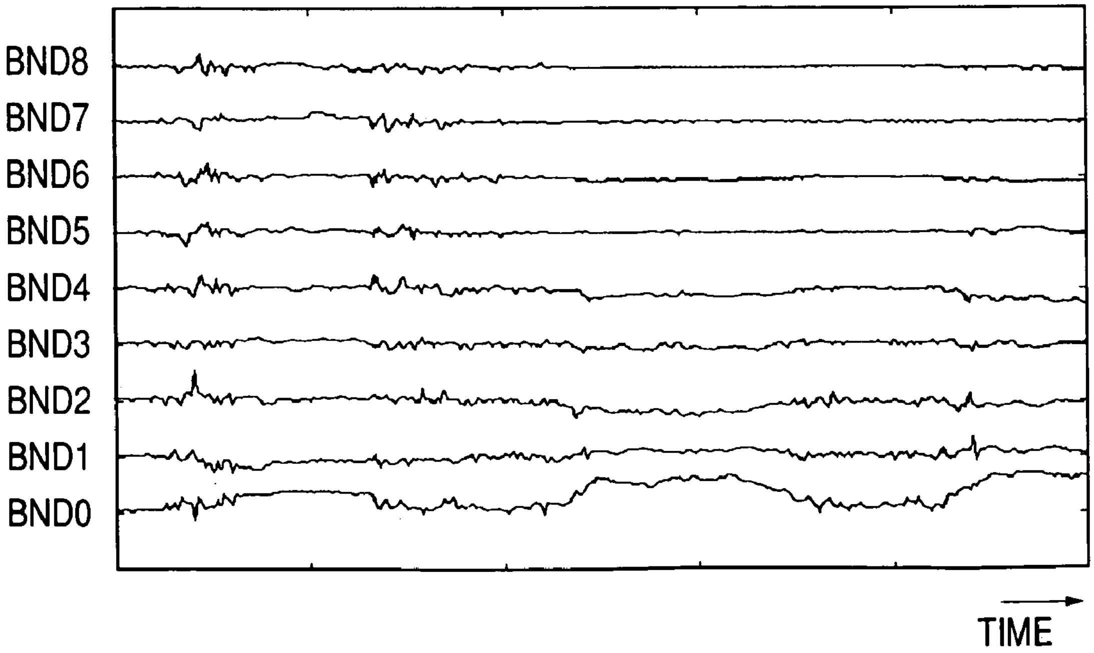

FIG. 6(*a*) is a graph showing a time change in the intensity of the fundamental frequency component and harmonic components of the voice having the spectrum shown in FIG. 4(*a*).

FIG. 6(*b*) is a graph showing a time change in the intensity of the fundamental frequency component and harmonic components of the voice having the spectrum shown in FIG. 4(*b*).

Figure 7:
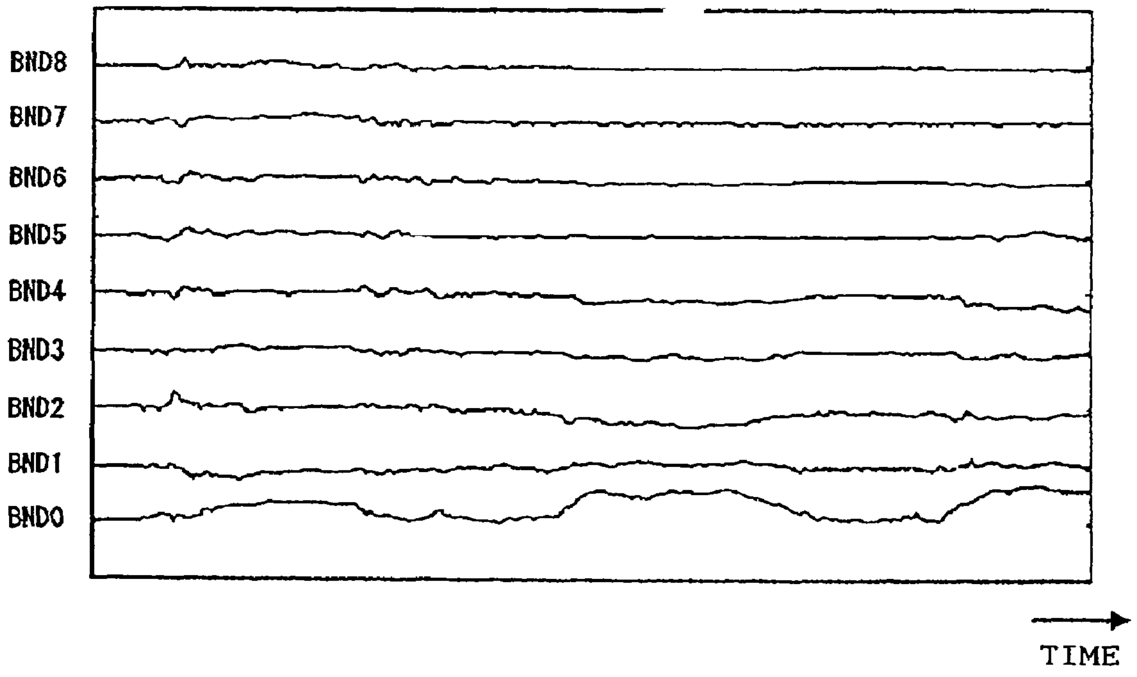
FIG. 7 is a graph showing a time change in the intensity of the fundamental frequency component and harmonic components of the voice having the spectrum shown in FIG. 5.

FIG. 7 is a graph showing a time change in the intensity of the fundamental frequency component and harmonic components of the voice having the spectrum shown in FIG. 5.

As seen from the comparison of the spectrum shown in FIG. 5 with the spectra shown in FIGS. 4(*a*) and 4(*c*), the spectrum obtained by interpolating the spectrum components into the voice subjected to masking by using the voice interpolation apparatus shown in FIG. 1 is more similar to the spectrum of original voice than the spectrum obtained by interpolating the spectrum components into the voice subjected to masking by using the method disclosed in Japanese Patent Laid-open Publication No. 2001-35678.

As shown in FIG. 6(*b*), the graph showing the time change in the intensity of the fundamental frequency component and harmonic components of a voice whose spectrum components are partially removed by masking is not smoother than the graph showing the time change in the intensity of the fundamental frequency components and harmonic components of the original voice shown in FIG. 6(*a*). (In FIG. 6(*a*), FIG. 6(*b*) and FIG. 7, a graph "BND0" shows the intensity of the fundamental frequency component of voice, and a graph "BNDk" (where k is an integer from 1 to 8) shows the intensity of the (k+1)-th harmonic component of voice).

As shown in FIG. 7, the graph showing the time change in the intensity of the fundamental frequency component and harmonic components of a signal obtained by interpolating the spectrum components into a signal of a voice subjected to masking by using the voice interpolation apparatus shown in FIG. 1 is smoother than the graph shown in FIG. 6(*b*), and is more similar to the graph showing the time change in the intensity of the fundamental frequency component and harmonic components of the original voice shown in FIG. 6(*a*).

Voices reproduced by the voice interpolating apparatus shown in FIG. 1 are natural voices more similar to original voices than voices reproduced through interpolation by the method of Japanese Patent Laid-open Publication No. 2001-356788 or voices reproduced without spectrum interpolation of a signal subjected to masking.

The time length in a unit pitch section of voice data input to the voice signal interpolation apparatus is normalized by the pitch length fixing unit 3 to eliminate fluctuation of pitches. Therefore, the sub-band data generated by the sub-band dividing unit 4 supplies a correct time change in the intensity of each frequency component (fundamental frequency component and harmonic components) of a voice represented by voice data. The sub-band data generated by the averaging unit 5 supplies therefore a correct time change in the intensity of each frequency component of a voice represented by voice data.

The structure of the pitch waveform deriving system is not limited only to those described above.

For example, the voice input unit 1 may acquire voice data from an external via a telephone line, a private line, or a communication line such as a satellite channel. In this case, the voice data input unit 1 is provided with a communication control unit such as a modem, a DSU (Data Service Unit) and a router.

The voice data input unit 1 may have a voice collection apparatus constituted of a microphone, an AF amplifier, a sampler, an A/D (Analog-to-Digital) converter, a PCM encoder and the like. The voice collecting apparatus amplifies a voice signal representative of a voice collected by the microphone, samples and A/D converts it, and makes the sampled voice signal be subjected to PCM to acquire voice data. Voice data to be acquired by the voice data input unit 1 is not necessarily limited to a PCM signal.

The voice output unit 8 may supply voice data supplied from the pitch restoring unit 7 or data obtained by demodulating the voice data, to an external via a communication line. In this case, the voice output unit 8 is provided with a communication control unit constituted of, for example, a modem, a DSU or the like.

The voice output unit 8 may write voice data supplied from the pitch restoring unit 7 or data obtained by demodulating the voice data, in an external recording medium or an external storage device such as a hard disk. In this case, the voice output unit 8 is provided with a control circuit such as a recording medium driver and a hard disk controller.

The number of sub-band data pieces used by the averaging unit 5 for generating the averaged sub-band data is not limited only to three data pieces, but it may be a plurality of data pieces per one piece of averaged sub-band data. A plurality of sub-band data pieces used for generating the averaged sub-band data is not required to be supplied in succession from the sub-band dividing unit 4. For example, the averaging unit 5 may acquire a plurality of sub-band data pieces at the interval of two data pieces (or at the interval of a plurality of data pieces) supplied from the sub-band dividing unit 4, and only the acquired sub-band data pieces are used for generating the averaged sub-band data.

When one piece of the sub-band data is supplied from the sub-band dividing unit 4, the averaging unit 52 may once store it in the sub-band data storage part 51 and read the newest three pieces of sub-band data to generate the averaged sub-band data.

The embodiment of the invention has been described above. The voice signal interpolation apparatus of the invention can be realized not only by a dedicated system but also by a general computer system.

For example, a program for performing the operations of the voice data input unit 1, pitch deriving unit 2, pitch length fixing unit 3, sub-band dividing unit 4, averaging unit 5, sub-band synthesizing unit 6, pitch restoring unit 7 and voice output unit 8 may be stored in the medium (CD-ROM, MO, flexible disk or the like). The program is installed in a personal computer having a D/A converter, an AF amplifier, a speaker and the like to execute the above-described processes and realize the voice signal interpolation apparatus by using the personal computer.

This program may be distributed, for example, via a communication line by up-loading it to a bulletin board system (BBS) on the communication line. A carrier may be modulated by a signal representative of the program, and the modulated wave is transmitted to a receiver site which demodulates it to restore the program.

The above-described processes can be executed by starting up the program and executing it under the control of OS in a manner similar to general application programs.

If OS is in charge of a portion of the processes or if it constitutes a portion of one constituent element of the invention, the program removing a program part corresponding to such a portion may be stored in a recording medium. Even in this case, the recording medium is assumed in this invention that it stores a program for executing each function or step to be executed by the computer.

EFFECTS OF THE INVENTION

As described so far, according to the invention, a voice signal interpolation apparatus and method is realized which can restore original human voices from human voices in a compressed state while maintaining a high sound quality.

What is claimed is:

1. A voice signal interpolation apparatus comprising:

pitch waveform signal generating means for acquiring an input voice signal representative of a waveform of voice and making a time length of a section corresponding to a unit pitch of said input voice signal be substantially the same to transform said input voice signal into a pitch waveform signal;

wherein said pitch waveform signal generating means comprises:

a variable filter whose frequency characteristics can be controlled to be variable, said variable filter filtering said input voice signal to derive a fundamental frequency component of the input voice;

filter characteristic determining means for identifying a fundamental frequency of the input voice in accordance with the fundamental frequency component derived by said variable filter and controlling said variable filter so as to have the frequency characteristics cutting off frequency components other than frequency components near the identified fundamental frequency;

wherein said filter characteristic determining means comprises:

cross detecting means for identifying a period of timings at which the fundamental frequency components derived by said variable filter reach a predetermined value and identifying the fundamental frequency in accordance with the identified period;

average pitch detecting means for detecting a time length of a pitch of voice represented by said input voice signal in accordance with said input voice signal before being filtered; and judging means for judging whether the period identified by said cross detecting means and the time length of the pitch identified by said average pitch detecting means are different from each other by a predetermined amount or more, if it is judged that the period and the time length are not different, controlling said variable filter so as to have the frequency characteristics cutting off frequency components other than frequency components near the fundamental frequency identified by said cross detecting means, and if it is judged that the period and the time length are different, controlling said variable filter so as to have the frequency characteristics cutting off frequency components other than frequency components near a fundamental frequency identified from the time length of the pitch identified by said average pitch detecting means.

2. A voice signal interpolation apparatus according to claim 1, wherein said voice signal interpolation apparatus comprises:

spectrum deriving means for generating data representative of a spectrum of said input voice signal in accordance with the pitch waveform signal;

averaging means for generating averaged data representative of a spectrum of a distribution of average values of respective spectrum components of said input voice signal, in accordance with a plurality of data pieces generated by said spectrum deriving means; and voice signal restoring means for generating an output voice signal representative of voice having a spectrum represented by the averaged data generated by said averaging means.

3. A voice signal interpolation apparatus according to claim 1, wherein said pitch waveform signal generating means comprises: characteristics cutting off frequency components other than frequency components near the identified fundamental frequency;

pitch deriving means for dividing said input voice signal into a voice signal in the section corresponding to the unit pitch, in accordance with a value of the fundamental frequency component derived by said variable filter; and pitch length fixing means for generating the pitch waveform signal having substantially the same time length in each section by sampling each section of said input voice signal at substantially the same number of samples.

4. A voice signal interpolation apparatus according to claim 1, wherein said average pitch detecting means comprises:

cepstrum analyzing means for calculating a frequency at which a cepstrum of the input voice signal before filtered by said variable filter takes a maximal value;

self-correlation analyzing means for calculating a frequency at which a periodgram of the input voice signal before filtered by said variable filter takes a maximal value; and average calculating means for calculating an average value of pitches of voice represented by the input voice signal in accordance with the frequencies calculated by said cepstrum analyzing means and said self-correlation analyzing means and identifying the calculated average value as the time length of the pitch of the voice.

* * * * *